United States Patent
Nagaraj et al.

(10) Patent No.: US 9,302,272 B2
(45) Date of Patent: *Apr. 5, 2016

(54) FROTH FLOTATION PROCESSES

(71) Applicant: CYTEC TECHNOLOGY CORP., Wilmington, DE (US)

(72) Inventors: Devarayasamudram Ramachandran Nagaraj, Ridgefield, CT (US); Peter Riccio, New Rochelle, NY (US); Tarun Bhambhani, Stamford, CT (US); Alan S. Rothenberg, Wilton, CT (US); Carmina Quintanar, Santiago (CL); Bing Wang, Brookfield, CT (US)

(73) Assignee: CYTEC TECHNOLOGY CORP., Wilmington, DE (US)

( * ) Notice: Subject to any disclaimer, the term of this patent is extended or adjusted under 35 U.S.C. 154(b) by 477 days.

This patent is subject to a terminal disclaimer.

(21) Appl. No.: 13/653,713

(22) Filed: Oct. 17, 2012

(65) Prior Publication Data

US 2013/0092604 A1 Apr. 18, 2013

Related U.S. Application Data

(60) Provisional application No. 61/548,408, filed on Oct. 18, 2011.

(51) Int. Cl.
| | | |
|---|---|---|
| *B01D 21/00* | (2006.01) | |
| *C02F 1/24* | (2006.01) | |
| *B03D 1/01* | (2006.01) | |
| *B03D 1/012* | (2006.01) | |
| *B03D 1/014* | (2006.01) | |
| *B03D 1/08* | (2006.01) | |

(52) U.S. Cl.
CPC ............ *B03D 1/012* (2013.01); *B01D 21/0084* (2013.01); *B03D 1/011* (2013.01); *B03D 1/014* (2013.01); *C02F 1/24* (2013.01); *B03D 1/085* (2013.01); *B03D 2201/02* (2013.01); *B03D 2203/02* (2013.01); *B03D 2203/025* (2013.01)

(58) Field of Classification Search
CPC .... B01D 15/00; B01D 21/01; B01D 21/0084; C02F 1/24; B03D 1/01; B03D 1/001; B03D 1/011; B03D 1/012; B03D 1/014; B03D 1/02; B03D 2201/02; C01B 33/26
USPC .......... 209/164–167; 210/702–705, 709, 724, 210/723, 734, 735, 738; 252/61
See application file for complete search history.

(56) References Cited

U.S. PATENT DOCUMENTS

| | | | |
|---|---|---|---|
| 1,949,956 A | | 3/1934 | Derby et al. |
| 2,043,192 A | * | 6/1936 | Christmann et al. .......... 209/166 |
| 2,063,629 A | | 12/1936 | Salzberg et al. |
| 2,074,699 A | | 3/1937 | Lenher et al. |
| 2,120,217 A | * | 6/1938 | Harris ............................ 209/166 |
| 2,134,706 A | | 11/1938 | Derby et al. |
| 2,185,968 A | | 1/1940 | Ralston et al. |
| 2,201,535 A | * | 5/1940 | Harris ............................ 554/90 |
| 2,221,377 A | * | 11/1940 | Harris ............................ 560/149 |
| 2,267,307 A | | 12/1941 | Ralston et al. |
| 2,278,020 A | | 3/1942 | Ralston et al. |
| 2,293,470 A | * | 8/1942 | Mead et al. ................... 209/166 |
| 2,330,587 A | | 9/1943 | Jayne, Jr. |
| 2,389,718 A | | 11/1945 | Davis |
| 2,812,332 A | | 11/1957 | Pennino |
| 2,919,025 A | * | 12/1959 | Booth et al. ................... 209/166 |
| 2,991,430 A | | 7/1961 | Allred et al. |
| 3,002,014 A | | 9/1961 | Dinsmore et al. |
| 3,203,968 A | * | 8/1965 | Sebba ............................. 534/11 |
| 3,214,018 A | * | 10/1965 | Neal ............................. 209/166 |
| 3,238,127 A | * | 3/1966 | Sebba ............................. 210/704 |
| 3,355,017 A | * | 11/1967 | Wystrach et al. ............. 209/166 |
| 3,425,550 A | | 2/1969 | Baarson et al. |
| 3,476,553 A | * | 11/1969 | Ray et al. ......................... 75/429 |
| 3,536,679 A | * | 10/1970 | Langer, Jr. .................... 526/180 |
| 3,570,772 A | * | 3/1971 | Booth et al. ................. 241/24.13 |
| 3,671,612 A | | 6/1972 | Roszinski et al. |
| 3,737,458 A | * | 6/1973 | Langer et al. ................. 564/374 |
| 3,742,099 A | | 6/1973 | Colclough et al. |
| 3,788,467 A | | 1/1974 | Werneke |
| 3,845,862 A | | 11/1974 | McGuire et al. |
| 3,845,863 A | | 11/1974 | Savia |
| 3,925,218 A | | 12/1975 | Zipperian et al. |
| 3,971,836 A | | 7/1976 | Strow et al. |
| 4,022,686 A | * | 5/1977 | Arakatsu et al. .............. 209/166 |
| 4,036,746 A | | 7/1977 | Strow et al. |

(Continued)

FOREIGN PATENT DOCUMENTS

| | | |
|---|---|---|
| CA | 771181 A | 11/1967 |
| CA | 808222 A | 3/1969 |
| CA | 1105156 A | 7/1981 |
| CA | 1188014 A | 5/1985 |
| CA | 1299777 C | 4/1992 |
| EP | 1439216 A1 | 7/2004 |
| GB | 1353976 A | 5/1974 |
| GB | 2178446 A | 2/1987 |
| JP | 2001247848 A | 9/2001 |
| JP | 2003064347 A | 3/2003 |
| WO | 03049867 A1 | 6/2003 |
| WO | 2008019451 A1 | 2/2008 |

OTHER PUBLICATIONS

IPRP of PCT/2012/060525_dated Apr. 22, 2014; IPRP for PCT/US2012/060526_dated Apr. 22, 2014; IPRP for PCT/US2012/060527_dated Apr. 22, 2014.

(Continued)

*Primary Examiner* — Joseph Drodge
(74) *Attorney, Agent, or Firm* — Charles E. Bell

(57) ABSTRACT

Froth flotation processes that include adding a beneficiating amount of a value mineral collector composed of an organic ammonium salt of a sulfur-containing acid to at least one stage of a froth flotation process to recover value minerals from mineral ore bodies are disclosed herein.

20 Claims, No Drawings

(56) References Cited

U.S. PATENT DOCUMENTS

| | | | |
|---|---|---|---|
| 4,040,950 A | 8/1977 | Zipperian et al. | |
| 4,102,781 A | 7/1978 | Tenbergen | |
| 4,215,067 A * | 7/1980 | Brannen | C07F 9/165 556/25 |
| 4,472,288 A | 9/1984 | Frost, Jr. | |
| 4,530,758 A | 7/1985 | Tibbals et al. | |
| 4,584,097 A * | 4/1986 | Fu et al. | 209/166 |
| 4,595,493 A * | 6/1986 | Nagaraj | 209/166 |
| 4,601,818 A * | 7/1986 | Bresson et al. | 209/166 |
| 4,684,459 A | 8/1987 | Klimpel et al. | |
| 4,699,712 A | 10/1987 | Unger | |
| 4,789,466 A | 12/1988 | von Rybinski et al. | |
| 4,793,852 A * | 12/1988 | Harris et al. | 423/26 |
| 4,830,739 A | 5/1989 | Hellsten et al. | |
| 4,853,110 A * | 8/1989 | Singhal et al. | 208/253 |
| 4,879,022 A * | 11/1989 | Clark et al. | 209/166 |
| 4,908,125 A * | 3/1990 | Mackenzie et al. | 209/166 |
| 5,147,572 A | 9/1992 | Bush | |
| 5,627,294 A * | 5/1997 | Adams | C07F 9/165 508/368 |
| 5,874,522 A * | 2/1999 | Figuly | C08G 73/02 424/78.12 |
| 5,929,408 A * | 7/1999 | Gutierrez et al. | 209/166 |
| 6,732,867 B2 | 5/2004 | Magliocco et al. | |
| 6,756,346 B1 | 6/2004 | Baba et al. | |
| 6,820,746 B2 | 11/2004 | Magliocco et al. | |
| 6,988,623 B2 | 1/2006 | Magliocco et al. | |
| 7,011,216 B2 | 3/2006 | Magliocco et al. | |
| 7,165,680 B2 | 1/2007 | Rajic et al. | |
| 7,299,930 B2 | 11/2007 | Correa-Castillo et al. | |
| 8,376,142 B2 * | 2/2013 | Nagaraj | 209/166 |
| 8,720,694 B2 * | 5/2014 | Nagaraj et al. | 209/166 |
| 2005/0150330 A1 | 7/2005 | Rajic et al. | |
| 2010/0021370 A1 * | 1/2010 | Nagaraj et al. | 423/561.1 |

OTHER PUBLICATIONS

International Search Report and Written Opinion of PCT/US2012/060525; mailing date Jun. 18, 2013.

International Search Report and Written Opinion of PCT/US2012/060526; mailing date Oct. 9, 2013.

International Search Report and Written Opinion of PCT/US2012/060527; mailing date Jul. 5, 2013.

Office Action of US. Appl. No. 13/653,732 dated Mar. 20, 2015.

* cited by examiner

FROTH FLOTATION PROCESSES

CROSS-REFERENCE TO RELATED APPLICATIONS

This application claims benefit of priority from U.S. Provisional Application No. 61/548,408 filed Oct. 18, 2011 the content of which is incorporated herein by reference in its entirety. This application is also related in subject matter to U.S. application Ser. No. 13/653,669 filed Oct. 17, 2012; and to U.S. application Ser. No. 13/653,732 filed Oct. 17 2012.

BACKGROUND OF THE INVENTION

1. Field

The disclosed subject matter relates generally to compositions and processes used in the recovery of value minerals from mineral ore bodies. More particularly, the disclosed subject matter relates to froth flotation processes that utilize an organic ammonium salt of a sulfur-containing acid as a value mineral collector.

2. State of the Art

Froth flotation is a widely used process for beneficiating ores containing valuable minerals, often referred to as "value minerals". Value mineral(s) refer to the metal, metals, mineral or minerals that are the primary object of the flotation process, i.e., the metals and minerals from which it is desirable to remove impurities.

A typical froth flotation process involves intermixing an aqueous slurry that contains finely ground ore particles with a frothing or foaming agent to produce a froth. Ore particles that contain the value mineral(s) are preferentially attracted to the froth because of an affinity between the froth and the exposed mineral on the surfaces of the ore particles. The resulting beneficiated minerals are then collected by separating them from the froth. Chemical reagents, referred to as "collectors," are commonly added to the froth flotation process to effect the separation. Certain theory and practice indicates that success of a flotation process for base metal sulfide and precious metal ores is dependent on the collectors which impart selective hydrophobicity to the value mineral separated from other minerals. See, e.g., U.S. Pat. No. 4,584,097, the entirety of which is incorporated by reference herein.

Other reagents, such as "frothers", may be added to the process to provide a suitable basic froth phase to capture hydrophobic value minerals and facilitate separation and recovery thereof. Certain other reagents, referred to as "modifiers", may be used to enhance separation and recovery of the desired minerals and/or metals. Modifiers, which can include pH regulators, may be used to modify and control the pH of the ore pulp in order to enhance separation and recovery of the desired minerals and/or metals. In some instances, compounds referred to as "activators", such as copper sulfate, may be used to activate a certain value sulfide mineral in order to enhance collector coating on this sulfide mineral.

Froth flotation is especially useful for separating finely ground value minerals from the associate gangue or for separating value minerals from one another. Because of the large scale on which mining operations are typically conducted, and the large difference in value between the desired minerals and the associated gangue, even relatively small increases in separation efficiency provide substantial gains in productivity. Additionally, the large quantities of chemicals used in mining and mineral processing pose a significant challenge in terms of health and safety to humans and the environment. Consequently, the industry is continually searching for effective alternatives that increase safety while lessening the impact on the environment.

Currently, a large variety of organic sulfur-containing compounds, such as xanthates, dithiophosphates, dithiocarbamates, etc, are utilized as collectors in the flotation recovery of value minerals from sulfide and precious metal ores. Existing thought about such compounds is that either the free acid or any salt of the acid can be used in flotation, and that all the salts and free acid are equivalent, and obtain substantially the same result. Moreover, most of the collectors based on organic sulfur-containing salts are aqueous and are the sodium or potassium salts of sulfur-containing acid. Thus, when names of collectors are mentioned, such as a xanthate or dithiophosphate, it is in reference to a sodium or potassium salt.

A commonly used collector, xanthic acid, is an ionic compound that is produced and transported as solid sodium or potassium salts of xanthic acid and is used as aqueous solutions at the mine site. While they have shown value in mining processes, xanthates oxidize and hydrolyze in the presence of water thereby releasing hazardous byproducts, and causing reduction in metallurgical performance, such as reduction in value mineral recovery and/or grade. Solid xanthate can pose a fire hazard. Other common water-soluble ionic collectors pose similar hazards to a varying degree and display reduced metallurgical performance. An additional hazard is when such aqueous collectors are mixed with other collectors, some toxic gases may be generated, or precipitates can be formed, which reduce the activity of the available collector or form some other undesirable reaction products, all of which also cause reduced metallurgical performance.

Many current collector and formulations thereof do contain water, which reduces the available active collector and contributes significantly to transportation costs. Given the recent increase in fuel costs, cost-effective transportation and energy savings are important in developing alternatives to current collectors.

In view of the foregoing, there is a need in the art to develop a stable collector formulation that offers improved metallurgical performance, cost savings, as well as reductions in hazards to humans and the environment. The inventors of the instant invention believe the subject matter disclosed and claimed herein is an answer to those needs.

SUMMARY OF THE INVENTION

The value mineral collectors composed of organic amine salts of organic sulfur-containing acids as described herein are practical, economically attractive and environmentally friendly alternatives compared to aqueous ionic collectors such as alkali metal salts of organic sulfur-containing acids. Consequently, the collector compositions of the present invention offer many advantages including easier handling, as well as reduced costs to ship the compositions to remote metallurgical plants. As shown in more detail below, the collector compositions of the present invention surprisingly exhibit improved recovery of value minerals.

Accordingly, one aspect of the current invention is directed to froth flotation processes for recovering value minerals from mineral ore bodies by: adding a beneficiating amount of a collector to at least one stage of a froth flotation process, wherein the collector is an organic tertiary or quaternary ammonium salt of a sulfur-containing acid selected from the group consisting of hydrocarbyl dithiophosphoric acids, hydrocarbyl monothiophosphoric acids, mercaptobenzothiazoles, hydrocarbyl xanthic acids, hydrocarbyl dithiocarbamic acids, hydrocarbyl thioglycolic acids and hydrocarbyl trithiocarbonic acids.

In a further aspect, the present invention is directed to froth flotation processes for recovering at least one value mineral from a mineral ore body, the process comprising the steps of: grinding a mineral ore body containing at least one value mineral to form ground ore; forming a slurry comprising the ground ore; intermixing an effective amount of at least one value mineral collector as described herein with at least one of the ground ore, the slurry, and combinations thereof; generating a froth with the slurry; and recovering the at least one value mineral from the froth.

These and other objects, features and advantages of this invention will become apparent from the following detailed description of certain embodiments of the invention taken in conjunction with the accompanying Examples.

DETAILED DESCRIPTION OF CERTAIN EMBODIMENTS OF THE INVENTION

The disclosed subject matter generally relates to processes and collectors, used in the recovery of value minerals from an ore. In general, ores contain, inter alia, both "value" and "non-value" minerals. In this context, "value" mineral(s) refer to the metal, metals, mineral or minerals that are the primary object of the flotation process, i.e., the metals and minerals from which it is desirable to remove impurities. Examples of metals of interest include, but are not limited to, gold, silver, copper, cobalt, nickel, lead, zinc, molybdenum, and platinum group metals, such as platinum and palladium, as well as combinations thereof. The term "non-value" mineral refers to the metal, metals, mineral or minerals for which removal from the value mineral is desired, i.e., impurities in the value mineral. A non-value mineral is not necessarily discarded, and may be considered a value mineral in a subsequent process.

While any ore may be subjected to the processes and the collectors described herein, the disclosed subject matter typically pertains to base metal sulfide ores and precious metal ores. Examples of such ores include, but are not limited to, Cu—Mo ores, Cu—Au ores, primary Au ores, platinum group metal (PGM) ores, Cu ores, Ni ores, and complex polymetallic ores containing Pb, Zn, Cu and Ag.

In one embodiment, the value mineral collector includes an organic ammonium salt compound according to Formula I:

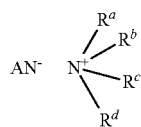

Formula I where: AN⁻ is an anion from an organic sulfur-containing acid selected from the group consisting of hydrocarbyl dithiophosphoric acids, hydrocarbyl monothiophosphoric acids, mercaptobenzothiazoles, hydrocarbyl xanthic acids, hydrocarbyl dithiocarbamic acids, hydrocarbyl thioglycolic acids and hydrocarbyl trithiocarbonic acids; $R^a$ is hydrogen or a hydrocarbyl group comprising from 1 to 16 carbon atoms, optionally substituted with a —OH group and/or with one or more —(YR')$_n$—YR" groups, wherein n=0 to 3, Y is O, NR''' or S, R' is an alkylene or arylene group containing from 1 to 12 carbon atoms, R" and R''' are, each independently, hydrogen or a hydrocarbyl group containing from 1 to 12 carbon atoms; and each of $R^b$, $R^c$ and $R^d$ is, independently, a hydrocarbyl group comprising from 1 to 16 carbon atoms, optionally substituted with a —OH group and/or with one or more —(YR')$_n$—YR" groups, wherein n=0 to 3, Y is O, NR''' or S, R' is an alkylene or arylene group containing from 1 to 12 carbon atoms, R" and R''' are, each independently, hydrogen or a hydrocarbyl group containing from 1 to 12 carbon atoms; and wherein two or more of $R^a$, $R^b$, $R^c$ and $R^d$ may be linked to form a cyclic compound.

The organic ammonium salt of a sulfur-containing acid collector is derived from sulfur-containing organic acids that contain at least one ionizable —SH or —OH group attached to a carbon atom or a phosphorus atom. The organic ammonium salt is a tertiary or quaternary ammonium salt, preferably a tertiary ammonium salt.

In one preferred embodiment, the collector is substantially free of water and substantially fee of inorganic salts. The phrase "substantially free of water" as used herein encompasses compositions that include less than 10% water by weight. For instance, compositions that would be considered to be substantially free of water can include less than 10% water by weight, e.g., 7% wt.; 5% wt.; 4% wt.; 3.5% wt, 3.0% wt., 2.75% wt., 2.5% wt., 2.0% wt., 1.5% wt., 1.0% wt., 0.5% wt., 0.1% wt., 100 ppm, and the like.

The phrase "substantially free of inorganic salts" as used herein encompasses collector compositions that include less than 5% inorganic salt by weight. For instance, collector compositions that would be considered to be substantially free of inorganic salt can include less than 5% inorganic salt by weight, e.g., 4% wt.; 3.5% wt, 3.0% wt., 2.75% wt., 2.5% wt., 2.0% wt., 1.5% wt., 1.0% wt., 0.5% wt., 0.1% wt., 100 ppm, and the like.

As used herein, the terms "hydrocarbyl group", "hydrocarbon group", "hydrocarbyl" and "hydrocarbon", encompass compounds containing hydrogen and carbon atoms, optionally substituted with one or more groups such as —OH groups and/or with one or more —(YR')$_n$—YR" groups, wherein n=0 to 3, Y is O, NR''' or S, R' is an alkylene or arylene group containing from 1 to 12 carbon atoms, R" and R''' are, each independently, H or a hydrocarbyl group containing from 1 to 12 C atoms. As used herein, the pluralized version of acid, i.e., acids, indicates that the compounds can be substituted or unsubstituted. The term "substituted" as used herein encompasses the replacement of one element, such as hydrogen, by another atom or a group containing one or more atoms or a heteroatom or a group containing one or more heteroatoms.

In some embodiments of the organic ammonium cation of the collector according to Formula I, the $R^a$ group is a hydrocarbyl group containing 1-16 carbon atoms, optionally substituted by an —OH group. However, it is contemplated that the $R^a$ group may also be a hydrocarbyl group containing 1-10 carbon atoms or a hydrocarbyl group containing 1-6 carbon atoms, optionally substituted by an —OH group.

In certain embodiments of the organic ammonium cation of the collector according to Formula I, $R^a$ is hydrogen.

$R^a$ is preferably hydrogen or an alkyl group or an aryl group, and more preferably hydrogen or an alkyl group containing 1 to 10 carbon atoms, most preferably 1 to 4 carbon atoms, optionally substituted with a —OH group.

Each of the $R^b$, $R^c$ and $R^d$ groups of the organic ammonium cation may individually be a hydrocarbyl group containing 1-16 carbon atoms, optionally substituted with one or more groups such as —OH groups and/or with one or more —(YR')$_n$—YR" groups, wherein n=0 to 3, Y is O, NR''' or S, R' is an alkylene or arylene group containing from 1 to 12 carbon atoms, R" and R''' are, each independently, H or a hydrocarbyl group containing from 1 to 12 C atom. Preferably, each of the $R^b$, $R^c$ and $R^d$ groups of the organic ammonium cation are, individually, a hydrocarbyl group containing 1-10 carbon atoms, more preferably containing 1-6 carbon atoms. $R^b$, $R^c$ and $R^d$ are preferably independently an alkyl group containing 1 to 10, more preferably 1 to 6 and most preferably 1 to 4, carbon atoms.

In some embodiments, $R^b$, $R^c$ and $R^d$ are, independently, alkyl groups having 1-16 carbon atoms or aryl groups having 6-12 carbon atoms. In a further example, $R^b$, $R^c$ and $R^d$ independently are alkyl groups having 1-10 carbon atoms, preferably alkyl groups having 1-6 carbon atoms, more preferably having 1 to 4 carbon atoms, optionally substituted by a —OH group.

In other embodiments, at least three of $R^a$, $R^b$, $R^c$ and $R^d$ are an alkyl group containing from 1 to 4 carbon atoms.

In certain embodiments, at least two of $R^b$, $R^c$ and $R^d$ are linked to form a cyclic compound. In another embodiment, $R^b$, $R^c$ and $R^d$ are linked to form a cyclic compound. An example of a cyclic compound is hexamethylene tetramine.

The organic ammonium cation ($N^+R^aR^bR^cR^d$) of Formula I may be selected from choline, tetrahydrocarbyl amines and trihydrocarbyl amines, and mixtures thereof.

Specific examples of ammonium salts include, but are not limited to, trimethylammonium, (N,N-dimethyl, N-propyl ammonium), (N,N-dimethyl, N-ethyl ammonium), (N-Allyl-N,N-dimethylammonium), triethylammonium, tripropylammonium, tributylammonium, tetramethylammonium, tetraethylammonium, tetrapropylammonium, tetrabutylammonium, triallylammonium, trimethanolammonium, triethanolammonium, tripropanolammonium, choline, triphenylammonium, hexamethylene tetraammonium and diphenylethyl ammonium salts, and ammonium salts derived from pyrrole and the like, and mixtures thereof. Preferred organic ammonium cations are tertiary ammonium cations.

The organic ammonium cation ($N^+R^aR^bR^cR^d$) of Formula I preferably has a molecular weight that does not exceed 300, more preferably not exceeding 250 and most preferably not exceeding 200. The organic ammonium cation ($N^+R^aR^bR^cR^d$) of Formula I preferably has a molecular weight of at least 60.

In certain embodiments, the organic sulfur-containing acid of the collector is selected from hydrocarbyl dithiophosphoric acids, hydrocarbyl monothiophosphoric acids, mercaptobenzothiazoles, hydrocarbyl xanthic acids, hydrocarbyl dithiocarbamic acids, hydrocarbyl thioglycolic acids and hydrocarbyl trithiocarbonic acids.

Hydrocarbyl dithiophosphoric acids are generally according to the general formula

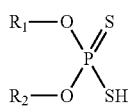

wherein R1 and R2 are hydrocarbyl groups with the proviso that R1 and R2 may be linked to form a cyclic compound. R1 and R2 are preferably and are each independently C2-C12 hydrocarbyl groups. Preferably, R1 and R2 are independently C2-C8 hydrocarbyl groups, more preferably C2-C4 hydrocarbyl groups. Examples of specific dihydrocarbyl dithiophosphoric acids include diisobutyl dithiophosphoric acid, diethyl dithiophosphoric acid, diisoamyl dithiophosphoric acid, diisopropyl dithiophosphoric acid, dicresyl dithiophosphoric acid, di-sec-butyl dithiophosphoric acid, di-2-ethylhexyl dithiophosphoric acid, ethyl sec-butyl dithiophosphoric acid, and ethylamyldithiophosphoric acid.

Hydrocarbyl monothiophosphoric acids are generally according to the general formula

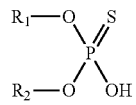

wherein R1 and R2 are each independently a C2-C12 hydrocarbyl group, with the proviso that R1 and R2 may be linked to form a cyclic compound. Preferably, R1 and R2 are each independently a C2-C8 hydrocarbyl group, more preferably C2-C4 hydrocarbyl groups. Examples of specific dihydrocarbyl monothiophosphoric acids include diisobutyl monothiophosphoric acid, diethyl monothiophosphoric acid, diisoamyl monothiophosphoric acid, diisopropyl monothiophosphoric acid, dicresyl monothiophosphoric acid, di-sec-butyl monothiophosphoric acid, di-2-ethylhexyl monothiophosphoric acid and ethyl sec-butyl monothiophosphoric acid.

Hydrocarbyl dithiocarbamic acids are usually selected from the group of dihydrocarbyl dithiocarbamic acids and monohydrocarbyl dithiocarbamic acids and are generally according to the general formula:

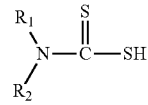

wherein R1 is H or a C1-C12 hydrocarbyl group and R2, independently, is a C1-C12 hydrocarbyl group, with the proviso that R1 and R2 may be linked to form a cyclic compound. Preferably, R1 and R2 are independently H or a C2-C8 hydrocarbyl group. More preferably, R1 and R2 are independently H or a C2-C4 hydrocarbyl group. Examples include diisobutyl dithiocarbamic acid, di-n-butyl dithiocarbamic acid, diethyl dithiocarbamic acid, diisopropyl dithiocarbamic acid, dibenzyl dithiocarbamic acid, diphenyl dithiocarbamic acid, dioctyl dithiocarbamic acid, monobutyl dithiocarbamic acid, monoethyl dithiocarbamic acid, butyl phenyl dithiocarbamic acid, ethyl butyl dithiocarbamic acid and the like.

Hydrocarbyl xanthic acids are generally according to the general formula:

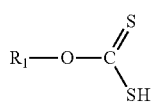

wherein R1 is a C2-C12 hydrocarbyl group. Preferably, R1 is a C2 to C5 hydrocarbyl group. Examples of specific hydrocarbyl xanthic acids include ethyl xanthic acid, n-butyl xanthic acid, isobutyl xanthic acid, n-propyl xanthic acid, isopropyl xanthic acid, sec butyl xanthic acid, n-amyl xanthic acid, isoamyl xanthic acid, 2 ethyl-hexyl xanthic acid, phenyl xanthic acid, benzyl xanthic acid.

Hydrocarbyl trithiocarbonic acids are generally according to the general formula

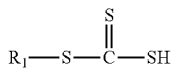

wherein R1 is a C2-C12 hydrocarbyl group. Preferably, R1 is a C4-C12 hydrocarbyl group. Examples of specific hydrocarbyl trithiocarbonic acids include butyl trithiocarbonic acid and dodecyl trithiocarbonic acid.

Hydrocarbyl thioglycolic acids are generally according to the general formula

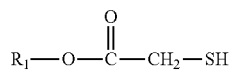

wherein R1 is a C2-C12 hydrocarbyl group. Preferably, R1 is C4 to C8 hydrocarbyl group. Examples of specific hydrocarbyl thioglycolic acids include butyl thioglycolic acid, octylthioglycolic acid, and dodecyl thioglycolic acid.

Mercaptobenzothiazoles are generally according to the general formula

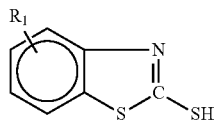

wherein R1 is H or a —O—(C1-C12 hydrocarbyl) group or a C1-C12 hydrocarbyl group. Preferably, R1 is a H or a C1 to C6 hydrocarbyl group. Examples of specific mercaptobenzothiazoles include 6-hexyl 2-mercaptobenzothiazole and 6-ethoxy 2-mercaptobenzothiazole. Preferred mercaptobenzothiazoles are selected from 2-mercaptobenzothiazole and 6-hydrocarbyl-2-mercaptobenzothiazoles.

In a preferred embodiment, the organic sulfur-containing collector is selected from the group consisting of tertiary and quaternary ammonium salts of hydrocarbyl dithiophosphoric acids, hydrocarbyl monothiophosphoric acids, mercaptobenzothiazoles, hydrocarbyl xanthic acids and hydrocarbyl dithiocarbamic acids.

Examples of the collectors composed of an ammonium salt of an organic sulfur-containing acid, include, but are not limited to, choline salt of diisobutyl dithiophosphoric acid, trimethylammonium salt of diisobutyl monothiophosphoric acid, triethylammonium salt of mercaptobenzothiazole, choline salt of mercaptobenzothiazole, triethylammonium salt of diisobutyl monothiophosphoric acid, choline salt of diisobutyl monothiophosphoric acid, tributylammonium salt of mercaptobenzothiazole, tripropylammonium salt of diisobutyl dithiophosphoric acid, triethylammonium salt of diethyl dithiocarbamic acid, tripropylammonium salt of dibutyl dithiocarbamic acid, trimethylammonium salt of diisobutyl dithiophosphoric acid, hexamethylene tetraammonium salt of diisobutyl dithiophosphoric acid, tetramethylammonium salt of diisobutyl dithiophosphoric acid, triethanolammonium salt of butyl thioglycolic acid, trimethylammonium salt of butyl trithiocarbonic acid, trimethylammonium salt of isobutyl xanthic acid, trimethylammonium salt of amyl xanthic acid, trimethylammonium salt of monobutyl dithiocarbamic acid, tripropylammonium salt of monoethyl dithiocarbamic acid, triethylammonium salt of dicresyl dithiophosphoric acid, trimethanolammonium salt of dicresyl dithiophosphoric acid, trimethanolammonium salt of diisobutyl dithiophosphoric acid, trimethylammonium salt of dibutyl dithiocarbamic acid, trimethylammonium salt of dicresyl dithiophosphoric acid, and trimethylammonium salt of mercaptobenzothiazole.

The physical state of the ammonium salt of an organic sulfur-containing acid is dependent on the organic ammonium cation and the sulfur-containing anion. For instance, trimethylammonium salt of diisobutyl dithiophosphoric acid and triethylammonium salt of diisobutyl dithiophosphoric acid are solids. Most other salts are liquid.

The compounds of organic ammonium salt of an organic sulfur-containing acid as described herein prove useful as value mineral collectors and may be used in methods for recovering at least one value mineral from an ore. In general, the organic ammonium salt of an organic sulfur-containing acid are utilized as collectors in froth flotation processes by adding a beneficiating amount of the collector (i.e., an amount of collector sufficient to effectively separate the value minerals from the non-value minerals) to one or more stages of the froth flotation process.

The collector compositions described herein may be added to the froth flotation processes as the organic ammonium salt of an organic sulfur-containing acid or they may be part of a composition additionally including one or more compound useful for froth flotation. In general, the collectors according to the present invention as described herein are present in the collector composition in amounts and ratios that are economically feasible as well as effective to the recovery of the value minerals. The amount of collector as described herein present in the collector composition can vary from about 1 wt. % to about 99 wt. % based on the total weight of the collector composition. In one embodiment, the amount of collectors as described herein present in the collector composition is between about 30 wt. % and about 70 wt. % based on the total weight of the collector composition.

Besides the collectors described herein, in some embodiments, the collector compositions may optionally include one or more other collectors different from the tertiary and quaternary ammonium salts of the organic sulfur-containing acids according to the invention as described herein. Such other collectors can be any known collectors, such as anionic collectors and neutral collectors.

In general, the tertiary and quaternary ammonium salts of the sulfur-containing collectors that are described above display excellent physical compatibility with neutral (so-called oily collectors) collectors. The physical stability of collector compositions that include the collector according to the invention as herein described, together with a neutral collector allows them to be handled in an easy manner. Moreover, such collector compositions are chemically stable and do not release toxic gases or fumes and do not require the use of hazardous diluents and coupling agents.

As alluded to above, in some embodiments, the collector compositions according to the present invention may optionally include one or more additives. Many such additives are known to those of skill in the froth flotation art and need not be further described in detail herein. Certain additives may include, for example, one or more of hydrocarbon oils, surfactants, aliphatic alcohols, glycols, glycol ethers and non-aqueous solvents. Combinations of the foregoing additives are also contemplated.

The amount and type of additives present in the collector composition will vary depending on one or more of the following variables: the type of collectors, the amount of the collectors, the type of ore, the value mineral, and the like, and combinations thereof. The person of ordinary skill in the art will be able to determine such values based on no more than routine experimentation. In one embodiment, the total amount of additives present in the collector composition is between about 1 wt. % and about 95 wt. % based on the total weight of the collector composition. In another embodiment, the total amount of additives present in the collector composition is between about 1 wt. % and about 50 wt. % based on the total weight of the collector composition.

One example of a froth flotation process includes crushing an ore to form crushed ore (referred to herein as the "pre-grinding" or the "pre-grind" stage), and then grinding the crushed ore particles in a grinding mill to form ground ore. A slurry of water and ground ore is formed. The steps of grinding the ore and forming the slurry may be collectively referred to as the "grinding stage". The slurry containing the ground ore is then sent to the "conditioning stage" where the ground ore is conditioned in a conditioner. The ground ore is subjected to a flotation process by passing air through the slurry in flotation cells or a bank of flotation cells to cause flotation of the desired minerals in a froth. The desired minerals, i.e., the value minerals, are collected ("recovered") from the froth in launders (referred to as the "flotation stage").

As one of ordinary skill in the art will appreciate, a froth flotation process may include more than one stage of grinding, conditioning and flotation. Thus, the flotation concentrate from the first stage (referred to as "roughers" or "rougher-scavengers") may be ground further and refloated in a circuit referred to as "cleaners". The cleaners may subject the concentrate of the first stage to further grinding, conditioning and flotation stages. Alternatively, the concentrate from the first stage may be refloated without further grinding.

The tails from the cleaners may be refloated in a circuit referred to as "cleaner-scavengers". It is envisioned that the froth flotation processes according to the present invention encompass the addition of froth phase modifiers, monovalent ion modifier enhancing agents and other collector compositions at any stage of the process, i.e., addition of the froth phase modifier (and/or monovalent ion modifier enhancing agent and/or collector) in some instance may be done until the second (or third) grinding stage, conditioning stage, or flotation stage.

Flotation reagents, which include the organic ammonium salts of the organic sulfur-containing collectors described herein as well as, for example, frothers, pH regulators, froth phase modifiers, dispersants, depressants, and the like, may be added to the crushed ore, ground ore and/or slurry, during the process at any or all of the stages of the froth flotation process. Typically the flotation reagents, such as the organic ammonium salts of the sulfur-containing acid collectors, especially those according to Formula I, described herein, are added to the froth flotation process at one or more stages of the process. For example, the organic ammonium salt of a sulfur-containing collector may be added to the grinding stage, the conditioning stage, or a combination thereof. The term "added" or any variation thereof, as used herein, means any method that can be used to bring two or more items or compounds together and encompasses intermixing, mixing, combining, incorporating, blending and the like. Similarly, the term "intermixed" or any variation thereof, as used herein, means any method that can be used to bring two or more items or compounds together and encompasses adding, intermixing, mixing, combining, incorporating, blending and the like.

The organic ammonium salts of the sulfur-containing collectors described herein are added to processes for recovering a value mineral from an ore in an amount that is effective ("effective amount" or "beneficiating amount") to recover the value mineral. The effective amount of the organic ammonium salt of a sulfur-containing acid may depend on a variety of factors, including the process used, the ore used, the contents of the organic ammonium salt of a sulfur-containing collector, and the like. In one embodiment the effective amount of the organic ammonium salt of a sulfur-containing collector added to the process is from about 0.5 gram per ton (g/t) to about 500 g/t. In another embodiment, the effective amount of the organic ammonium salt of a sulfur-containing collector added to the process is from about 1 g/t to about 200 g/t. In yet another embodiment, the effective amount of the organic ammonium salt of a sulfur-containing collector added to the process is from about 2 g/t to about 100 g/t. In still a further embodiment, the effective amount of the organic ammonium salt of a sulfur-containing collector added to the process is from about 5 g/t to about 50 g/t. In another embodiment, the effective amount of the organic ammonium salt of a sulfur-containing collector is from about 5 g/t to about 20 g/t.

The organic ammonium salts of sulfur-containing collectors described herein, or the collector compositions containing them, are typically added to processes in a liquid form. Some of the compositions, when manufactured, can be in a solid form, but these can be readily made into liquid form by dissolving in a suitable solvent or diluent.

Besides the organic ammonium salts of the sulfur-containing collectors described herein, or the collector compositions containing them, other collectors can be added to the froth flotation process separately or simulataneously.

EXAMPLES

The following examples are provided to assist one skilled in the art to further understand certain embodiments of the present invention. These examples are intended for illustration purposes and are not to be construed as limiting the scope of the various embodiments of the present invention.

Unless otherwise specifically noted, the following notations are used in the Examples below: "percent," "%", "weight %" and "wt. %" denotes weight percent, "g" denotes gram, "° C." denotes degrees Celsius, "g/t" denotes gram per ton, "min" denotes "minutes", "rec" and "Rec" denote recovery of value mineral in concentrate, "S rec" represents the total recovery of all the sulfide minerals, "colt" stands for collector, "rpm" stands for revolutions per minute, "kg" is kilogram, "ppm" is parts per million on a mass basis (also equal to g/t), "ml" is milliliter, and "L" is liter.

Example 1

Preparation of Triethylammonium Salt of Diisobutyl Dithiophosphoric Acid

Preparation of triethylammonium salt of diisobutyl dithiophosphoric acid is as follows: 130 grams (0.54 mole) of diisobutyl dithiophosphoric acid is charged into a jacketed pressure reactor. The system is bubbled through with nitrogen for 20 min and 55.5 grams (0.55 mole) of triethylamine is added to the addition funnel and the entire system is under nitrogen. Then, with the system monitored by a pressure gauge and thermometer, triethylamine is then added drop wise and the reaction temperature is kept under 50° C. and pressure under 10 psi. After the addition is over, the system is brought to 50° C. through the jacket by a heating circulator. The reaction temperature is kept at 50° C. for 1 hour. The product is then discharged. The acid number (normally below 30) and iodine number (between 40-43) are measured to check the acidity and percent dithiophosphoric acid. The product purity (ranging between 88-95%) is measured by LC-MS and NMR.

Example 2

Preparation of Tetraethylammonium Salt of Diisobutyl Dithiophosphoric Acid

Preparation of tetraethylammonium salt of diisobutyl dithiophosphoric acid is as follows: 264 grams (0.50 mole) of sodium diisobutyl dithiophosphate is charged into a jacketed reactor. The system is bubbled through with nitrogen for 20 min and 165.7 grams (0.50 mole) of tetraethylammonium chloride (50% solution in water) is added slowly through an addition funnel to the DTP acid. The reactor is heated at 50 to 60° C. for 1 hour with vigorous agitation. Then, 50 ml of toluene is added to dissolve the product and the aqueous layer is separated and drained out. The toluene solution is then washed with 50×2 ml water and dried with magnesium sulfate. After that filtration is applied to remove the magnesium sulfate and the toluene is stripped out at 20 mm Hg/80° C. condition to obtain final product. The product is then discharged. The product purity (ranging between 80-90%) is measured by LC-MS and NMR.

Example 3

Preparation of Trimethylammonium Salt of Diisobutyl Dithiophosphoric Acid

Preparation of trimethylammonium salt of diisobutyl dithiophosphoric acid is as follows: 130 grams (0.54 mole) of diisobutyl dithiophosphoric acid is charged into a jacketed pressure reactor. The system is bubbled through with nitrogen for 20 min and 35 grams (0.59 mole) of liquefied trimethylamine is added to the addition funnel and the entire system is then sealed under nitrogen. Then, with the system monitored by a pressure gauge and thermometer, trimethylamine is then added drop wise and kept the reaction temperature under 50° C. and pressure under 10 psi. After the addition is over, the system is brought to 50° C. through the jacket by a heating circulator. The reaction temperature is kept at 50° C. for 1 hour. The product is then discharged. The acid number (normally below 30) and iodine number (between 40-43) are measured to check the acidity and percent dithiophosphoric acid. The product purity (ranging between 88-95%) is measured by LC-MS and NMR.

Example 4

Preparation of Tripropylammonium Salt of Diisobutyl Dithiophosphoric Acid

Preparation of tripropylammonium salt of diisobutyl dithiophosphoric acid is as follows: 130 grams (0.54 mole) of diisobutyl dithiophosphoric acid is charged into a jacketed pressure reactor. The system is bubbled through with nitrogen for 20 min and 77.2 grams (0.54 mole) of tripropylamine is added to the addition funnel and the entire system is under nitrogen. Then, with the system monitored by a thermometer, tripropylamine is added drop wise and the reaction temperature is kept under 50° C. After the addition is over, the system is brought to 50° C. through the jacket by a heating circulator. The reaction temperature is kept at 50° C. for 1 hour. The product is then discharged. The acid number (normally below 30) and iodine number (between 40-43) are measured to check the acidity and percent dithiophosphoric acid. The product purity (ranging between 88-95%) is measured by LC-MS and NMR.

Example 5

Preparation of Choline Salt of Diisobutyl Dithiophosphoric Acid

Preparation of choline salt of diisobutyl dithiophosphoric acid is as follows: 264 grams (0.50 mole) of sodium diisobutyl dithiophosphate is charged into a jacketed reactor. The system is bubbled through with nitrogen for 20 min and 139.6 grams (0.50 mole) of choline chloride (50% solution in water) is added slowly through an addition funnel to the DTP acid. The reactor is heated at 50 to 60° C. for 1 hour with vigorous agitation. Then, 50 ml of toluene is added to dissolve the product and the aqueous layer is separated and drained out. The toluene solution is then washed with 50×2 ml water and dried with magnesium sulfate. After that, filtration is applied to remove the magnesium sulfate and the toluene is stripped out at 20 mm Hg/80° C. condition to obtain a final product. The product is then discharged. The product purity (ranging between 80-90%) is measured by LC-MS and NMR.

Example 6

Preparation of Choline Salt of Mercaptobenzothiazole

Preparation of choline salt of mercaptobenzothiazole is as follows: 83.6 grams (0.50 mole) of powder 2-mercaptobenzothiazole is suspended in 100 ml absolute ethanol and neutralized by mixing 134.4 grams (0.50 mole) of choline hydroxide (45 wt. % in methanol) at room temperature under nitrogen. Then the mixture is heated to 50° C. for 1 hour. The solution is then stripped under vacuum to remove the excess ethanol/methanol to obtain final product. The acid number (normally below 30) is measured to check the acidity. The product purity (ranging between 80-90%) is measured by LC-MS and NMR.

Example 7

Preparation of Triethylammonium Salt of Mercaptobenzothiazole

Preparation of triethylammonium salt of mercaptobenzothiazole is as follows: 83.6 grams (0.50 mole) of powder 2-mercaptobenzothiazole is suspended in 100 ml absolute ethanol and neutralized by mixing 50.5 grams (0.50 mole) of triethylamine at room temperature under nitrogen. Then the mixture is heated to 50° C. for 1 hour. The solution is then stripped under vacuum to remove the excess ethanol/methanol to obtain final product. The acid number (normally below 30) is measured to check the acidity. The product purity (ranging between 80-90%) is measured by LC-MS and NMR.

Example 8

Preparation of Tributylammonium Salt of Mercaptobenzothiazole

Preparation of tributylammonium salt of mercaptobenzothiazole is as follows: 83.6 grams (0.50 mole) of powder 2-mercaptobenzothiazole is suspended in 100 ml absolute ethanol and neutralized by mixing with 92.7 grams (0.50 mole) of tributylamine at room temperature under nitrogen. Then the mixture is heated to 50° C. for 1 hour. The solution is then stripped under vacuum to remove the excess ethanol to obtain final product. The acid number (normally below 30) is measured to check the acidity. The product purity (ranging between 80-90%) is measured by LC-MS and NMR.

Example 9

Preparation of Triethylammonium N,N-Diethyl Dithiocarbamate

Preparation of triethylammonium salt of diethyl dithiocarbamate is as follows: 76 grams (1 mole) carbon disulfide and 101 grams (1 mole) triethylamine are mixed at 10° C. under nitrogen. To the mixture is added in slowly 80.5 grams (1.1 mole) diethylamine drop wise and maintain the temperature below 30° C. Then the mixture is heated to 50° C. for 1 hour. The solution is then stripped out under vacuum to remove the excess amine and for the removal of low volatiles to obtain final product. The acid number (normally below 30) is measured to check the acidity. The product purity (ranging between 85-95%) is measured by LC-MS and NMR.

Example 10

Preparation of Tripropylammonium N,N-Diethyl Dithiocarbamate

Preparation of tripropylammonium salt of diethyl dithiocarbamate is as follows: 76 grams (1 mole) carbon disulfide and 143 grams (1 mole) tripropylamine are mixed at 10° C. under nitrogen. 80.5 grams (1.1 mole) diethylamine is added slowly and drop wise to the mixture and the mixture is maintained at a temperature below 30° C. Then the mixture is heated to 50° C. for 1 hour. The solution is then stripped out under vacuum to remove the excess amine and for the removal of low volatiles to obtain final product. The acid number (normally below 30) is measured to check the acidity. The product purity (ranging between 85-95%) is measured by LC-MS and NMR.

Example 11

Preparation of Choline Salt of Diisobutyl Monothiophosphoric Acid

Preparation of choline salt of diisobutyl monothiophosphoric acid ("MTP acid") is as follows: 248 grams (0.50 mole) of sodium diisobutyl monothiophosphate (Aero 6697, 50% solution in water) is charged into a jacketed reactor. The system is bubbled through with nitrogen for 20 min and 134.4 grams (0.50 mole) of choline chloride (50 wt. % in water) is added slowly through an addition funnel to the MTP acid. The reactor is heated at 50 to 60° C. for 1 hour with vigorous agitation. Then, 50 ml of toluene is added to dissolve the product and the aqueous layer is separated and drained out. The toluene solution is then washed with 50×2 ml water and dried with magnesium sulfate. After that, filtration is applied to remove the magnesium sulfate and the toluene is stripped out at 20 mm Hg/80° C. condition to obtain final product. The product is then discharged. The product purity (ranging between 80-90%) is measured by LC-MS and NMR.

Example 12

Preparation of Triethylammonium Salt of Diisobutyl Monothiophosphoric Acid

Preparation of triethylammonium salt of diisobutyl monothiophosphoric acid is as follows: 248 grams (0.50 mole) of sodium diisobutyl monothiophosphate (Aero 6697, 50% solution in water) is charged into a jacketed reactor. The system is bubbled through with nitrogen for 20 min and 50.5 grams (0.50 mole) of triethylamine is added slowly through an addition funnel to the MTP acid. The reactor is heated at 50 to 60° C. for 1 hour with vigorous agitation. Then, 50 ml of toluene is added to dissolve the product and the aqueous layer is separated and drained out. The toluene solution is then washed with 50×2 ml water and dried with magnesium sulfate. After that, filtration is applied to remove the magnesium sulfate and the toluene is stripped out at 20 mm Hg/80° C. condition to obtain final product. The product is then discharged. The product purity (ranging 80-90%) is measured by LC-MS and NMR.

Examples 13-26

Recovery of Mineral Values from a Au Ore

An ore sample containing Au (1.3 ppm or g/t) is beneficiated by froth flotation. In each test, 1000 g of ore sample is ground for 17 min in a mild steel rod mill containing a 10 kg rod charge and approximately 660 ml of water resulting in ground ore slurry with a particle size distribution of approximately 80% passing 106 microns. Lime is added to the mill to achieve a target pH of approximately 9.7 in the flotation stage. After grinding, the slurry is then transferred to a 2.5 L Denver flotation cell and water is added to adjust the solids density to 33%. The slurry is agitated at 1200 rpm in the cell. The collector is added in one addition at 25 g of active collector per ton of ore in the conditioning stage. The frother used is a (15:85) mixture of glycols and methyl isobutyl carbinol added at 30 g/t of ore in the flotation stage. Flotation is conducted for 7 min. The results are presented in Table 1 (for tests at pH 6.5) and Table 2 (for tests at pH 9.7).

TABLE 1

Au ore (pH 6.5)

| Example No* | Dosage, g/t | Collector type | Au Rec, % |
|---|---|---|---|
| 13C | 25 | NaDIBDTP | 67.6 |
| 14 | 25 | Ch—DIBDTP | 74.9 |
| 15 | 25 | TEA—DIBDTP | 76.6 |
| 16C | 25 | NaMBT | 65.1 |
| 17 | 25 | Ch—MBT | 66.9 |
| 18 | 25 | TEA—MBT | 73.1 |
| 19C | 25 | NaDIBMTP | 64.1 |
| 20 | 25 | Ch—DIBMTP | 69.4 |
| 21 | 25 | TEA—DIBMTP | 71.5 |

TABLE 2

Au ore (pH 9.7)

| Example No* | Dosage, g/t | Collector type | Au Rec, % |
|---|---|---|---|
| 22C | 25 | NaDIBDTP | 74.3 |
| 23 | 25 | Ch—DIBDTP | 78.5 |

TABLE 2-continued

Au ore (pH 9.7)

| Example No* | Dosage, g/t | Collector type | Au Rec, % |
|---|---|---|---|
| 24 | 25 | TEA—DIBDTP | 78.5 |
| 25C | 25 | NaDIBMTP | 70.5 |
| 26 | 25 | Ch—DIBMTP | 76.0 |

*C: Comparative
NaDIBDTP: Sodium salt of Diisobutyl Dithiophosphoric acid
Ch—DIBDTP: Choline salt of Diisobutyl Dithiophosphoric acid
TEA—DIBDTP: Triethylamine salt of Diisobutyl Dithiophosphoric acid
NaMBT: Sodium salt of Mercaptobenzothiaozole
TEA—MBT: Triethylamine salt of Mercaptobenzothiaozole
Ch—MBT: Choline salt of Mercaptobenzothiaozole
NaDIBMTP: Sodium salt of Diisobutyl Monothiophosphoric acid
TEA—DIBMTP: Triethylamine salt of Diisobutyl Monothiophosphoric acid
Ch—DIBMTP: Choline salt of Diisobutyl Monothiophosphoric acid Examples 27-39

Recovery of Mineral Values from a Ni Ore

An ore sample containing Ni (1.6%) is beneficiated by froth flotation. In each test, 500 g of ore sample is ground for 6 min in a mild steel rod mill containing a 9.2 kg rod charge and approximately 333 ml of water resulting in ground ore slurry with a particle size distribution of approximately 56% passing 75 microns. Lime is added to the mill to achieve a target pH of approximately 9.0 in the flotation stage. After grinding the slurry is then transferred to a 1.2 L Denver flotation cell and water is added to adjust the solids density to 33%. The slurry is agitated at 1000 rpm in the cell. The collector is added in one addition at 15 or 30 g of active collector per ton of ore in the conditioning or grinding stage. In all tests, the frother used is Dowfroth® 250 flotation agent, available from the Dow Chemical Company, USA, which is added at a dose of 25 g/t. It is noted that Dowfroth® 250 flotation agent can be replaced with Aerofroth® 68 flotation agent from Cytec Technologies Inc., USA. Flotation is conducted for 7 min. The results are presented in Table 3.

TABLE 3

Nickel Ore

| Example No* | Dosage, g/t | Collector Addition Point | Collector type | Ni Rec. % |
|---|---|---|---|---|
| 27C | 15 | Cell | NaMBT | 73.5 |
| 28 | 15 | Cell | TBA—MBT | 81.5 |
| 29C | 15 | Grind | NaDIBDTP | 66.0 |
| 30 | 15 | Grind | Ch—DIBDTP | 72.5 |
| 31 | 15 | Grind | TEA—DIBDTP | 70.6 |
| 32C | 15 | Grind | NaMBT | 65.8 |
| 33 | 15 | Grind | TBA—MBT | 76.2 |
| 34C | 30 | Cell | NaDIBDTP | 75.4 |
| 35 | 30 | Cell | Ch—DIBDTP | 77.2 |
| 36 | 30 | Cell | TEA—DIBDTP | 78.5 |
| 37C | 30 | Grind | NaDIBDTP | 71.2 |
| 38 | 30 | Grind | Ch—DIBDTP | 76.2 |
| 39 | 30 | Grind | TEA—DIBDTP | 77.1 |

*C: Comparative
Na DIBDTP: Sodium Diisobutyl Dithiophosphate
Ch—DIBDTP: Choline salt of Diisobutyl Dithiophosphoric acid
TEA—DIBDTP: Triethylamine salt of Diisobutyl Dithiophosphoric acid
NaMBT: Sodium Mercaptobenzothiaozole
TBA—MBT: Tributylamine salt of Mercaptobenzothiaozole Examples 40-50

Recovery of Mineral and Metal Values from a Precious Metal Containing Ore

An ore sample containing platinum group precious metals (approximately 2 g/t of Pt and 1.1 g/t of Pd; also containing value mineral Ni) is beneficiated by froth flotation in a single stage of grinding and flotation with the objective of maximizing the recovery of Pt and Pd in this stage. Additionally, it is desirable to recover almost all of the sulfide minerals including those of Ni. In each test, approximately 1 kg of ore sample is ground for 29.5 min in a mild steel rod mill containing a 10 kg rod charge and approximately 670 ml of water resulting in slurry having a particle size distribution of approximately 80% passing 106 microns. A total of 50 g/t of guar gum depressant as a 1% solution is added to the conditioning stage. The ground slurry is transferred to the 2.5 L Denver flotation cell and water is added to obtain slurry solids density of 33%. The slurry is agitated at 1300 rpm. The collector dosages are 40 or 60 g of active collector per ton of ore. The results are presented in Table 4.

TABLE 4

Pt—Pd Ore

| Example No* | Dosage, g/t | Collector type | Pt Rec. % | Pd Rec. % |
|---|---|---|---|---|
| 40C | 40 | NaDIBDTP | 52.2 | 52.9 |
| 41 | 40 | TEA—DIBDTP | 63.4 | 59.3 |
| 42C | 40 | NaDIBMTP | 41.9 | 44.4 |
| 43 | 40 | Ch—DIBMTP | 41.5 | 46.7 |
| 44 | 40 | TEA—DIBMTP | 48.9 | 50.8 |
| 45C | 60 | NaDIBDTP | 48.8 | 48.3 |
| 46 | 60 | Ch—DIBDTP | 66.9 | 62.5 |
| 47 | 60 | TEA—DIBDTP | 66.8 | 62.8 |
| 48C | 60 | NaDIBMTP | 36.5 | 40.8 |
| 49 | 60 | Ch—DIBMTP | 46.6 | 51.6 |
| 50 | 60 | TEA—DIBMTP | 51.4 | 54.6 |

*C: Comparative
NaDIBDTP: Sodium Diisobutyl Dithiophosphate
Ch—DIBDTP: Choline salt of Diisobutyl Dithiophosphoric acid
TEA—DIBDTP: Triethylamine salt of Diisobutyl Dithiophosphoric acid
NaDIBMTP: Sodium Diisobutyl Monothiophosphate
Ch—DIBMTP: Choline salt of Diisobutyl Monothiophosphoric acid
TEA—DIBMTP: Triethylamine salt of Diisobutyl Monothiophosphoric acid Examples 51-54

Recovery of Mineral Values from a Base Metal (Copper) Containing Ore

An ore sample containing Cu (0.56%) is beneficiated by froth flotation. In each test, 1000 g of ore sample is ground for 8.5 min in a mild steel rod mill containing a 10 kg rod charge and approximately 667 ml of water resulting in ground ore slurry with a particle size distribution of approximately 80% passing 106 microns Lime is added to the mill to achieve a target pH of approximately 10.5 in the flotation stage. After grinding, the slurry is then transferred to a 2.5 L Denver flotation cell and water is added to adjust the solids density to 33%. The slurry is agitated at 1200 rpm in the cell. The collector is added in one addition at 5 g of active collector per ton of ore in the conditioning stage. In all tests, the frother used is PBM 604 frother, available from Cytec Industries Inc., USA, which is added at a dose of 30 g/t. Flotation is conducted for 9 min. The results are presented in Table 5.

TABLE 5

Cu Ore

| Example No* | Dosage, g/t | Collector type | Cu Rec. % |
|---|---|---|---|
| 51C | 5 | NaDIBDTP | 83.1 |
| 52 | 5 | TEA—DIBDTP | 87.1 |
| 53 | 5 | Ch—DIBDTP | 86.7 |
| 54 | 5 | TetE—DIBDTP | 84.7 |

*C: Comparative
NaDIBDTP: Sodium salt of Diisobutyl Dithiophosphoric acid
TEA—DIBDTP: Triethylamine salt of Diisobutyl Dithiophosphoric acid
Ch—DIBDTP: Choline salt of Diisobutyl Dithiophosphoric acid
TetE—DIBDTP: Tetraethyl amine salt of Diisobutyl Dithiophosphoric acid Examples 55-57

Recovery of Mineral Values from a Base Metal (Copper) Containing Ore

The same ore and procedure as in Examples 51-54 are used in this example. In one comparative test, the sodium salt of diisobutyl dithiophosphoric acid is added to the ground pulp in the conditioning stage. In another comparative test, the choline and the diisobutyl dithiophosphoric acid are added separately to the ground pulp in the conditioning stage. In the example utilizing choline salt of the diisobutyl dithiophosphoric acid, it is added into the conditioning stage to the ground pulp. The results are presented in Table 6. These results demonstrate that separate additions of sulfur-containing acid and amine do not provide the same level of performance as is achieved with the amine salt of the sulfur-containing acid according to the invention.

TABLE 6

Cu ore

| Example No* | Col Type 1 | Dosage, g/t | Cu Rec., % |
|---|---|---|---|
| 55C | NaDIBDTP | 5 | 82.3 |
| 56C | Choline + DIBDTP Acid (added separately) | 5 | 80.9 |
| 57 | Ch—DIBDTP | 5 | 83.6 |

*C: Comparative
NaDIBDTP: Sodium salt of Diisobutyl Dithiophosphoric acid
Ch—DIBDTP: Choline salt of Diisobutyl Dithiophosphoric acid
Choline: Choline hydroxide
DIBDTP Acid: Diisobutyl Dithiophosphoric acid.

Examples 58-59

Recovery of Mineral Values from a Base Metal (Copper) Containing Ore

An ore sample containing Cu (0.56%) is beneficiated by froth flotation. In each test, 1000 g of ore sample is ground for 8.5 min in a mild steel rod mill containing a 10 kg rod charge and approximately 667 ml of water resulting in ground ore slurry with a particle size distribution of approximately 80% passing 106 microns Lime is added to the mill to achieve a target pH of approximately 10.5 in the flotation stage. After grinding, the slurry is then transferred to a 2.5 L Denver flotation cell and water is added to adjust the solids density to 33%. The slurry is agitated at 1200 rpm in the cell. The collector is added in one addition at 5 g of active collector per ton of ore in the conditioning stage. In all tests, the frother used is X-133, available from Cytec Industries Inc., USA, which is added at a dose of 15 g/t. Flotation is conducted for 9 min. The results are presented in Table 7.

TABLE 7

Cu Ore

| Example No* | Dosage, g/t | Collector type | Cu Rec. % |
|---|---|---|---|
| 58C | 4 | NaDIBDTP | 75.3 |
| 59 | 4 | TMA—DIBDTP | 82.8 |

*C: Comparative
NaDIBDTP: Sodium salt of Diisobutyl Dithiophosphoric acid
TMA—DIBDTP: Trimethylamine salt of Diisobutyl Dithiophosphoric acid Examples 60-64

Recovery of Mineral Values from a Base Metal (Copper) Containing Ore

The same ore and procedure as in Examples 58-59 are used in this example. In one comparative test, the trimethylamine and the diisobutyl dithiophosphoric acid are added separately to the ground pulp in the conditioning stage. In another comparative test, the trimethylamine is added with the sodium salt of the diisobutyl dithiophosphoric acid. In another comparative test, the diisobutyl dithiophosphoric acid is added by itself. Finally, the trimethylamine salt of diisobutyl dithiophosphoric acid is used. The results are presented in Table 8. These results demonstrate that separate additions of sulfur-containing acid and amine do not provide the same level of performance as is achieved with the organic amine salt of the sulfur-containing acid according to the invention. Also, adding the acid by itself does not result in good metallurgical performance. Additionally, addition of the trimethylamine alongside the sodium salt of the diisobutyl dithiophosphoric acid does not yield an improvement in metallurgical performance either.

TABLE 8

Cu ore

| Example No* | Component 1 type | Component 1 dosage, g/t | Component 2 type | Component 2 dosage (g/t) | Cu Rec., % |
|---|---|---|---|---|---|
| 60C | DIBDTP acid | 4 | TMA | 4 | 72.9 |
| 61C | DIBDTP acid | 4 | None | | 74.2 |
| 62C | Na DIBDTP | 4 | TMA | 4 | 72.9 |
| 63 | TMA DIBDTP | 4 | None | | 82.8 |

*C: Comparative
NaDIBDTP: Sodium salt of Diisobutyl Dithiophosphoric acid
TMA—DIBDTP: Trimethylamine salt of Diisobutyl Dithiophosphoric acid
DIBDTP Acid: Diisobutyl Dithiophosphoric acid.
TMA—Trimethylamine Examples 65-66

Recovery of Mineral Values from a Base Metal (Copper) Containing Ore

The same ore and procedure as in Examples 58-59 are used in this example. The comparative test is the inorganic ammonium salt of diisobutyl dithiophosphoric acid. The trimethylamine salt of diisobutyl dithiophosphoric acid collector composition according to the invention shows higher copper recovery.

TABLE 9

| | | Cu Ore | |
|---|---|---|---|
| Example No* | Dosage, g/t | Collector type | Cu Rec. % |
| 65C | 4 | Inorganic Ammonium ($NH^{4+}$) DIBDTP | 70.4 |
| 66 | 4 | TMA—DIBDTP | 82.8 |

*C: Comparative
Ammonium DIBDTP: Ammonium salt of Diisobutyl Dithiophosphoric acid
TMA—DIBDTP: Trimethylamine salt of Diisobutyl Dithiophosphoric acid As employed above and throughout the disclosure, various terms are provided to assist the reader. Unless otherwise defined, all terms of art, notations and other scientific terminology used herein are intended to have the meanings commonly understood by those of skill in the mineral and/or mining chemical arts. As used herein and in the appended claims, the singular forms include plural referents unless the context clearly dictates otherwise. All numbers expressing quantities of ingredients, reaction conditions, and so forth used in the specification and claims are to be understood as being modified in all instances by the term "about." Similarly, all numbers expressed in a range as indicated by the word "between" include the upper and lower limits in the range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Various patent and/or scientific literature references have been referred to throughout this application. The disclosures of these publications in their entireties are hereby incorporated by reference as if written herein. In the case of conflicting terms, the terms of this document will prevail. In view of the above description and the examples, one of ordinary skill in the art will be able to practice the invention as claimed without undue experimentation.

Although the foregoing description has shown, described, and pointed out the fundamental novel features of the present teachings, it will be understood that various omissions, substitutions, and changes in the form of compositions, as well as the uses thereof, may be made by those skilled in the art, without departing from the scope of the present teachings. Consequently, the scope of the present invention should not be limited to the foregoing discussion, but should be defined by the appended claims.

What is claimed is:

1. A froth flotation process for recovering at least one value mineral from a mineral ore body, the process comprising:
    adding a beneficiating amount of a collector to at least one stage of a froth flotation process, wherein the collector comprises a tertiary or quaternary organic ammonium salt of an organic sulfur-containing acid selected from the group consisting of hydrocarbyl dithiophosphoric acids, hydrocarbyl monothiophosphoric acids, mercaptobenzothiazoles, hydrocarbyl xanthic acids, hydrocarbyl dithiocarbamic acids, hydrocarbyl thioglycolic acids and hydrocarbyl trithiocarbonic acids.

2. A froth flotation process according to claim 1, wherein the tertiary or quaternary organic ammonium salt of an organic sulfur-containing acid is according to Formula I:

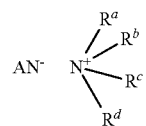

Formula I where:
    $AN^-$ is an anion from an organic sulfur-containing acid selected from the group consisting of hydrocarbyl dithiophosphoric acids, hydrocarbyl monothiophosphoric acids, mercaptobenzothiazoles, hydrocarbyl xanthic acids, hydrocarbyl dithiocarbamic acids, hydrocarbyl thioglycolic acids and hydrocarbyl trithiocarbonic acids;
    $R^a$ is hydrogen or a hydrocarbyl group comprising from 1 to 16 carbon atoms, optionally substituted with a —OH group and/or with one or more —(YR')$_n$—YR" groups; and
    each of $R^b$, $R^c$ and $R^d$ is independently chosen from a hydrocarbyl group comprising from 1 to 16 carbon atoms, optionally substituted with a —OH group and/or with one or more —(YR')$_n$—YR" groups,
        wherein for said one or more —(YR')$_n$—YR"groups of $R^a$, $R^b$, $R^c$, or $R^d$
        n =0 to 3,
        Y is O, NR'" or S,
        R' is an alkylene or arylene group containing from 1 to 12 carbon atoms,
        each of R" and R'" is independently chosen from hydrogen or a hydrocarbyl group containing from 1 to 12 carbon atoms; and
        wherein two or more of $R^a$, $R^b$, $R^c$ and $R^d$ may be linked to form a cyclic compound.

3. A froth flotation process according to claim 2, wherein $R^a$ is hydrogen or an alkyl group containing 1 to 10 carbon atoms, wherein the alkyl group is optionally substituted with an —OH group.

4. A froth flotation process according to claim 2, wherein each of $R^b$, $R^c$ and $R^d$ is independently chosen from an alkyl group containing 1 to 10 carbon atoms.

5. A froth flotation process according to claim 2, wherein at least three of $R^a$, $R^b$, $R^c$, and $R^d$ are an alkyl group containing from 1 to 4 carbon atoms.

6. A froth flotation process according to claim 2, wherein at least two of $R^b$, $R^c$, and $R^d$ are linked to form a cyclic compound.

7. A froth flotation process according to claim 1, wherein the organic sulfur-containing acid is selected from the group consisting of hydrocarbyl dithiophosphoric acids, hydrocarbyl monothiophosphoric acids, mercaptobenzothiazoles, hydrocarbyl xanthic acids and hydrocarbyl dithiocarbamic acids.

8. A froth flotation process according to claim 1, wherein the organic ammonium salt is selected from the group consisting of choline salts, tetrahydrocarbyl ammonium salts, and trihydrocarbyl ammonium salts.

9. A froth flotation process according to claim 1, wherein the organic ammonium salt is selected from the group consisting of trimethylammonium, (N,N-dimethyl, N-propylammonium), triethylammonium, tripropylammonium, tributylammonium, tetramethylammonium, tetraethylammonium, tetrabutylammonium, triethanolammonium, choline, triphenylammonium, hexamethylene tetraammonium, and diphenylethyl ammonium salts.

10. A froth flotation process according to claim 9, wherein the organic ammonium salt is trimethylammonium salt.

11. A froth flotation process according to claim 1, wherein the collector comprising a tertiary or quaternary organic ammonium salt of an organic sulfur-containing acid is selected from the group consisting of choline salt of diisobutyl dithiophosphoric acid, trimethylammonium salt of diisobutyl monothiophosphoric acid, triethylammonium salt of mercaptobenzothiazole, choline salt of mercaptobenzothiazole, triethylammonium salt of diisobutyl monothiophosphoric acid, choline salt of diisobutyl monothiophosphoric acid, tributylammonium salt of mercaptobenzothiazole, tripropylammonium salt of diisobutyl dithiophosphoric acid, triethylammonium salt of diethyl dithiocarbamic acid, tripropylammonium salt of dibutyl dithiocarbamic acid, trimethylammonium salt of diisobutyl dithiophosphoric acid, hexamethylene tetraammonium salt of diisobutyl dithiophosphoric acid, tetramethylammonium salt of diisobutyl dithiophosphoric acid, triethanolammonium salt of butyl thioglycolic acid, trimethylammonium salt of butyl trithiocarbonic acid, trimethylammonium salt of isobutyl xanthic acid, trimethylammonium salt of amyl xanthic acid, trimethylammonium salt of monobutyl dithiocarbamic acid, tripropylammonium salt of monoethyl dithiocarbamic acid, triethylammonium salt of dicresyl dithiophosphoric acid, trimethanolammonium salt of dicresyl dithiophosphoric acid, trimethanolammonium salt of diisobutyl dithiophosphoric acid, trimethylammonium salt of dibutyl dithiocarbamic acid, trimethylammonium salt of dicresyl dithiophosphoric acid, and trimethylammonium salt of mercaptobenzothiazole.

12. A froth flotation process according to claim 11, wherein the collector is selected from the group consisting of triethylammonium salt of mercaptobenzothiazole, triethylammonium salt of diisobutyl monothiophosphoric acid, triethylammonium salt of diethyl dithiocarbamic acid, and triethylammonium salt of dicresyl dithiophosphoric acid.

13. A froth flotation process according to claim 11, wherein the collector is selected from the group consisting of trimethylammonium salt of diisobutyl monothiophosphoric acid, trimethylammonium salt of diisobutyl dithiophosphoric acid, trimethylammonium salt of butyl trithiocarbonic acid, trimethylammonium salt of isobutyl xanthic acid, trimethylammonium salt of amyl xanthic acid, trimethylammonium salt of monobutyl dithiocarbamic acid, trimethylammonium salt of dicresyl monothiophosphoric acid, trimethylammonium salt of dicresyl dithiophosphoric acid, trimethylammonium salt of dibutyl dithiocarbamic acid, and trimethylammonium salt of mercaptobenzothiazole.

14. A froth flotation process according to claim 1, wherein the collector is substantially water free.

15. A froth flotation process according to claim 1, wherein the beneficiating amount of the collector is added in an amount between 0.5 and 500 grams per ton of ore, including the upper and lower limits in the range.

16. A froth flotation process according to claim 15, wherein the beneficiating amount of the collector is added in an amount between 1 and 200 grams per ton of ore, including the upper and lower limits in the range.

17. A froth flotation process according to claim 1 further comprising intermixing one or more additive selected from the group consisting of hydrocarbon oils, surfactants, aliphatic alcohols, glycols, glycol ethers, and non-aqueous solvents.

18. A froth flotation process according to claim 1, wherein the at least one stage of the froth flotation process is selected from the group consisting of flotation, grinding, conditioning, and pre-grinding stage.

19. A froth flotation process according to claim 1, wherein the at least one value mineral is selected from the group consisting of copper, cobalt, lead, zinc, nickel, molybdenum, gold, silver, and platinum group metals.

20. A froth flotation process according to claim 19, wherein the platinum group metal is platinum or palladium.

* * * * *